United States Patent
Lee et al.

(10) Patent No.: US 10,386,680 B2
(45) Date of Patent: Aug. 20, 2019

(54) CURVED LIQUID CRYSTAL DISPLAY DEVICE AND METHOD FOR MANUFACTURING THE SAME

(71) Applicant: Samsung Display Co. Ltd., Yongin-si, Gyeonggi-do (KR)

(72) Inventors: Gak Seok Lee, Hwaseong-si (KR); Tae Hoon Kim, Suwon-si (KR); Seung Yeon Jeong, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 252 days.

(21) Appl. No.: 15/219,909

(22) Filed: Jul. 26, 2016

(65) Prior Publication Data

US 2017/0212388 A1    Jul. 27, 2017

(30) Foreign Application Priority Data

Jan. 22, 2016    (KR) .................. 10-2016-0008082

(51) Int. Cl.
*G02F 1/1337*   (2006.01)
*G02F 1/1341*   (2006.01)
*G02F 1/1343*   (2006.01)

(52) U.S. Cl.
CPC ...... *G02F 1/133711* (2013.01); *G02F 1/1341* (2013.01); *G02F 1/133788* (2013.01); *G02F 1/134327* (2013.01); *G02F 2001/133726* (2013.01); *G02F 2001/133742* (2013.01); *Y10T 428/1005* (2015.01); *Y10T 428/1014* (2015.01)

(58) Field of Classification Search
CPC ......... G02F 1/133711; G02F 1/133788; G02F 1/1341; G02F 2001/133742; G02F 2001/133726; Y10T 428/1005; Y10T 428/1014
See application file for complete search history.

(56) References Cited

U.S. PATENT DOCUMENTS

| | | | |
|---|---|---|---|
| 7,550,094 B2 | 6/2009 | Jeng et al. | |
| 2008/0198301 A1* | 8/2008 | Jeng | G02F 1/13725 349/96 |
| 2013/0215346 A1* | 8/2013 | Lee | C09K 19/52 349/42 |
| 2013/0222740 A1* | 8/2013 | Miyachi | C09K 19/0225 349/89 |
| 2014/0176856 A1* | 6/2014 | Lee | G02F 1/133305 349/61 |
| 2016/0259211 A1 | 9/2016 | Lee et al. | |

FOREIGN PATENT DOCUMENTS

| KR | 1020130096456 | 8/2013 |
|---|---|---|
| KR | 1020140102953 | 8/2014 |
| KR | 1020150012093 | 2/2015 |
| KR | 1020160108718 A | 9/2016 |

* cited by examiner

*Primary Examiner* — Sophie Hon
(74) *Attorney, Agent, or Firm* — Cantor Colburn LLP

(57) ABSTRACT

A liquid crystal display device includes: a first curved substrate; a second curved substrate facing the first curved substrate; a liquid crystal layer interposed between the first curved substrate and the second curved substrate; a first curved liquid crystal alignment layer interposed between the liquid crystal layer and the first curved substrate; and a second curved liquid crystal alignment layer interposed between the liquid crystal layer and the second curved substrate, wherein the second curved liquid crystal alignment layer includes a nanoparticles including a hydrophobic group and a hydrophilic group.

16 Claims, 10 Drawing Sheets

CURVED LIQUID CRYSTAL DISPLAY DEVICE AND METHOD FOR MANUFACTURING THE SAME

CROSS-REFERENCE TO RELATED APPLICATION

This application claims priority to Korean Patent Application No. 10-2016-0008082 filed on Jan. 22, 2016, and all the benefits accruing therefrom under 35 U.S.C. § 119, the disclosure of which in its entirety is herein incorporated by reference.

BACKGROUND

1. Field

The present inventive concept relates to a curved liquid crystal display device and a method for manufacturing the curved liquid crystal display device.

2. Description of the Related Art

A liquid crystal display device is one of the most widely used flat panel display devices, and includes a liquid crystal module including a display substrate, an opposing substrate facing the display substrate, and a liquid crystal layer interposed between the two substrates, a backlight unit, and the like. The liquid crystal display device is configured such that a voltage is applied to the electric field generating electrodes so as to generate an electric field in the liquid crystal layer. The electric field determines the alignment direction of liquid crystal molecules in the liquid crystal layer to control polarization of incident light, thereby displaying desired images.

The size of a screen of a liquid crystal display device increases when the liquid crystal display device is used as a display device of a television receiver. As the size of the screen of the liquid crystal display device increases, the picture quality at different viewing angles may vary depending on whether a viewer sees the center or left and right ends of the screen.

To compensate for a viewing angle difference, a liquid crystal display device can be formed into a curved type display including a concave type and a convex type. The curved liquid crystal display device may be a portrait type in which the vertical length is longer than the horizontal length (i.e., width) thereof and which is curved in a vertical direction, or a landscape type in which the vertical length is shorter than the horizontal length thereof and which is curved in a horizontal direction.

SUMMARY

Aspects of the present inventive concept provide a curved liquid crystal display device and a method for manufacturing the curved liquid crystal display device having improved light transmittance.

Also, aspects of the present inventive concept provide a curved liquid crystal display device and a method for manufacturing the curved liquid crystal display device which prevents the formation of unnecessary patterns or specks.

According to an exemplary embodiment the curved liquid crystal display device includes: a first curved substrate; a second curved substrate facing the first curved substrate; a liquid crystal layer interposed between the first curved substrate and the second curved substrate; a first curved liquid crystal alignment layer interposed between the liquid crystal layer and the first curved substrate; and a second curved liquid crystal alignment layer interposed between the liquid crystal layer and the second curved substrate, wherein the second curved liquid crystal alignment layer includes a nanoparticle including a hydrophobic group and a hydrophilic group.

In an exemplary embodiment, the first curved liquid crystal alignment layer may include a degradation product of a polymerization initiator.

In an exemplary embodiment, the first curved liquid crystal alignment layer may be include a branched polymer, and the degradation product of the polymerization initiator may be bonded to a side chain branched from a main chain of the branched polymers.

In an exemplary embodiment, the second curved liquid crystal alignment layer may include no degradation product of the polymerization initiator.

In an exemplary embodiment, the nanoparticle may include a linear hydrocarbon having two terminal ends, and the hydrophobic group is positioned at one terminal end and the hydrophilic group may be positioned at the other terminal end.

In an exemplary embodiment, the liquid crystal layer includes first liquid crystal molecules having negative dielectric anisotropy aligned on a surface of the first curved liquid crystal alignment layer and second liquid crystal molecules aligned on a surface of the second curved liquid crystal alignment layer, and the second liquid crystal molecules may be configured to be vertically aligned and the first liquid crystal molecules are configured to have a pre-tilt angle in an initial state where no electric field is applied.

In an exemplary embodiment, the curved liquid crystal display device may further comprise: a pattern electrode interposed between the first curved substrate and the first curved liquid crystal alignment layer and having a slit pattern; and a patternless electrode interposed between the second curved liquid crystal alignment layer and the second curved substrate and having no slit pattern.

In an exemplary embodiment, the hydrophilic group of the nanoparticle may be adsorbed to the patternless electrode.

In an exemplary embodiment, the hydrophobic group of the nanoparticle may be adjacent to the liquid crystal layer.

In an exemplary embodiment, the nanoparticle may include hexadecyl trimethyl ammonium bromide (HTAB) or a polyhedral oligomeric silsesquioxane (POSS).

According to an exemplary embodiment a method for manufacturing a curved liquid crystal display device includes: providing a first flat substrate having a pattern electrode formed on a surface thereof; providing a second flat substrate facing the first flat substrate and having a patternless electrode formed on a surface thereof; forming a pre-vertical alignment layer including a reactive mesogen and a polymerization initiator on the pattern electrode on the first flat substrate; injecting a liquid crystal composition and a nanoparticle including a hydrophobic group and a hydrophilic group between the first flat substrate and the second flat substrate to form a liquid crystal layer; eluting the reactive mesogen from the pre-vertical alignment layer to the liquid crystal layer by applying a heat treatment; forming a vertical alignment layer and a pre-tilt alignment stabilization layer on the first flat substrate, wherein the vertical alignment layer comprises a degradation product of the polymerization initiator and the pre-tilt alignment stabilization layer comprises a polymer of the reactive mesogen, and wherein the vertical alignment layer and the pre-tilt stabilization layer are formed by light exposure in the presence of an electric field; and bending the first flat substrate and the second flat substrate to prepare a curved liquid crystal display device.

In an exemplary embodiment, the liquid crystal layer may include the nanoparticle in the range of about 0.01 weight percent (%) to about 0.5 weight %, based on a total weight of the liquid crystal layer.

In an exemplary embodiment, the nanoparticle may include a linear hydrocarbon having two terminal ends, and the hydrophobic group is positioned at one terminal end and the hydrophilic group may be positioned at the other terminal end.

In an exemplary embodiment, the nanoparticle may include hexadecyl trimethyl ammonium bromide (HTAB) or polyhedral oligomeric silsesquioxanes (POSS).

In an exemplary embodiment, the hydrophilic group of the nanoparticle may be adsorbed to the patternless electrode and the hydrophobic group may be positioned adjacent to the liquid crystal layer by injecting a liquid crystal layer after injection of the liquid crystal composition.

In an exemplary embodiment, the liquid crystal layer comprises first liquid crystal molecules adjacent to a surface of the patternless electrode of the second flat substrate and vertically aligned by the nanoparticle after the injecting of the liquid crystal composition.

In an exemplary embodiment, the first liquid crystal molecule may be vertically aligned with respect to the substrate as compared with second liquid crystal molecules on a surface of the pre-tilt alignment stabilization layer when an electric field is cancelled after the light exposure with electric field.

In an exemplary embodiment, the method may further comprise irradiating fluorescent ultraviolet light (UV) after the light exposure while applying the electric field.

A curved liquid crystal display device according to embodiments may have improved light transmittance. Furthermore, unnecessary patterns or specks caused by an application of a curved panel are prevented.

However, effects of the present inventive concept are not restricted to the exemplary embodiments set forth herein and more diverse effects are included in this description. The other embodiments of the present inventive concept which are not mentioned herein will become more apparent to a person skilled in the art to which the present inventive concept pertains by referencing the detailed description of the present inventive concept given below.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
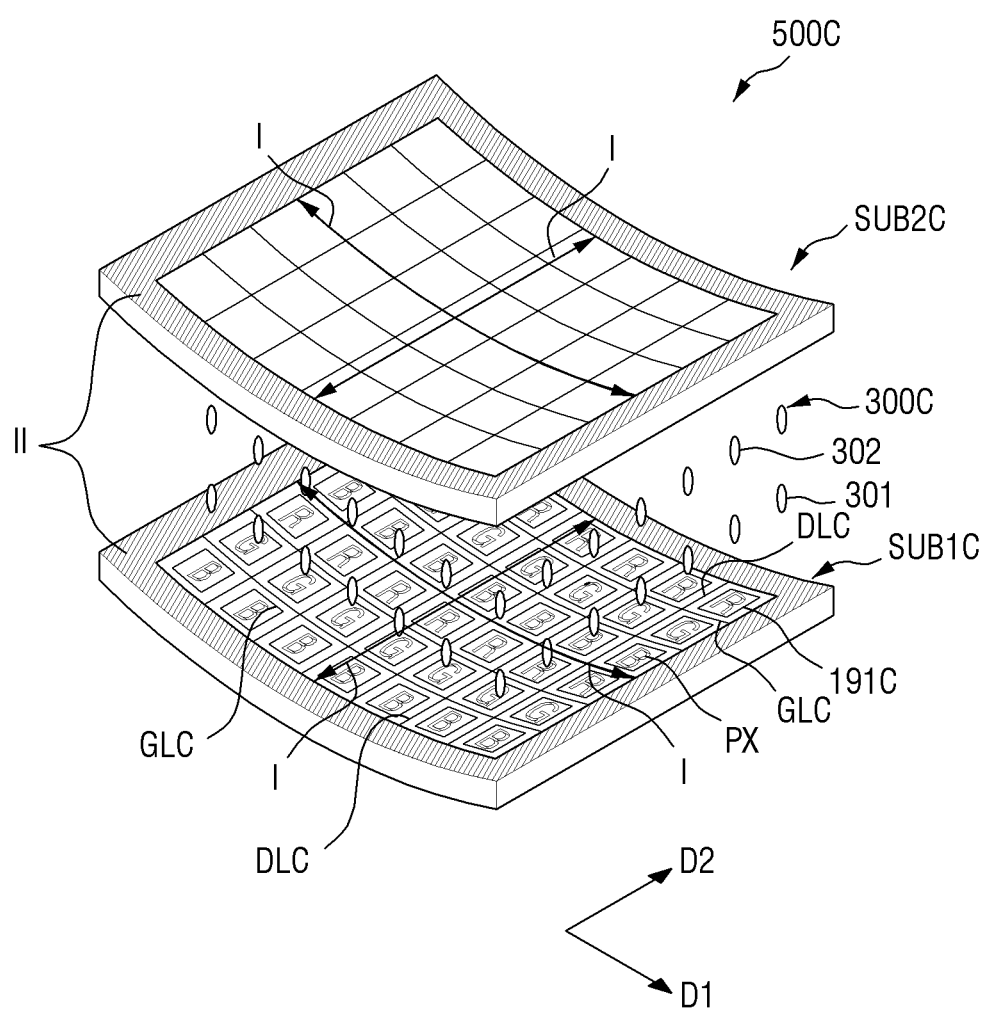
FIG. 1 is a schematic perspective view of a liquid crystal module of a curved liquid crystal display device according to an embodiment.

Features of the invention and methods of accomplishing the same may be understood more readily by reference to the following detailed description of preferred embodiments and the accompanying drawings.

The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, including "at least one," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments will be described with reference to the attached drawings.

FIG. 1 is a schematic perspective view of a liquid crystal module of a curved liquid crystal display device according to an embodiment. FIG. 2 is a schematic layout diagram illustrating a display substrate and an opposing display substrate of a liquid crystal module shown in FIG. 1.

Figure 2A:
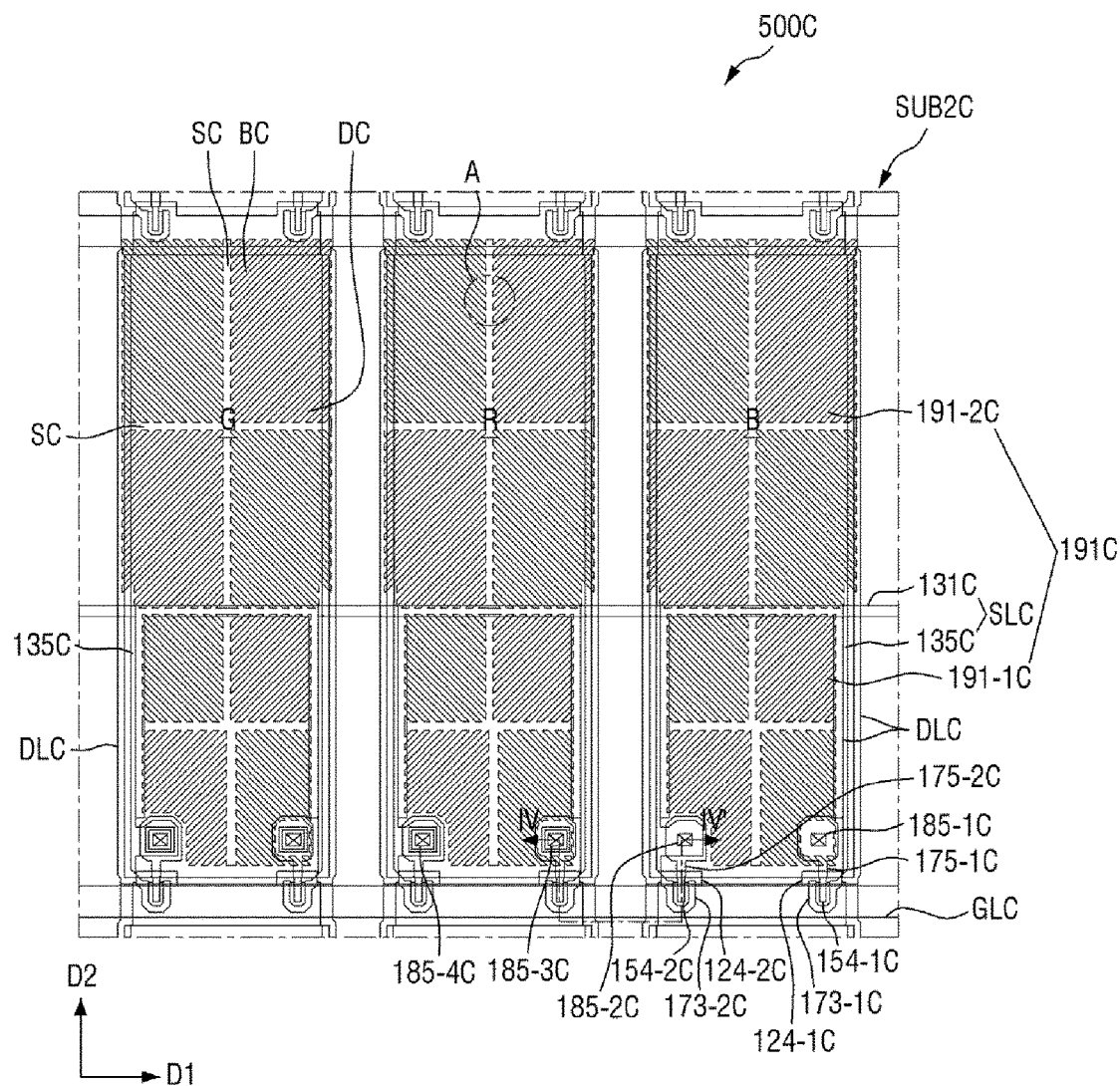
FIG. 2A is a schematic plan view illustrating a display substrate and an opposing display substrate of the liquid crystal module shown in FIG. 1.
Figure 2B:
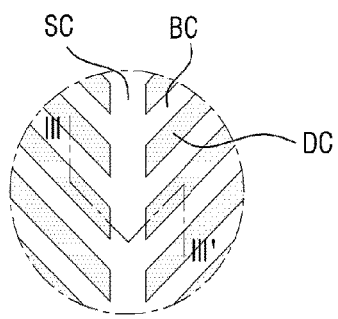
FIG. 2B is an enlarged view of region A of FIG. 2A.

Referring to FIG. 1 and FIGS. 2A and 2B, a curved liquid crystal display device according to an embodiment includes a liquid crystal module 500C including a display substrate SUB1C, an opposing display substrate SUB2C and a liquid crystal layer 300C. The display substrate SUB1C and the opposing display substrate SUB2C are spaced apart from each other with a predetermined cell gap maintained therebetween, and the liquid crystal layer 300C is interposed between the display substrate SUB1C and the opposing display substrate SUB2C. The liquid crystal layer 300C includes liquid crystal molecules 301 and 302. The liquid crystal layer 300C may include a liquid crystal composition having negative dielectric anisotropy.

The liquid crystal module 500C includes a display area I and a non-display area II. The display area I is where an image is viewed, and the non-display area II surrounding the display area I is a periphery of the display area I where an image is not viewed.

The display substrate SUB1C may include a plurality of gate lines GLC extending in a first direction D1 and a plurality of data lines DLC extending in a second direction D2 perpendicular to the first direction D1. Although not shown in the drawings, the gate lines GLC may extend to the non-display area II rather than being disposed only in the display area I, and in this case, a gate pad (not shown) may be disposed in the non-display area II. In this case, the display substrate SUB1C may include the gate pad (not shown) in the non-display area II. Furthermore, the data lines DLC may extend to the non-display area II rather than being disposed only in the display area I, and in this case, a data pad (not shown) may be disposed in the non-display area II. In this case, the display substrate SUB1C may include the data pad (not shown) in the non-display area II.

A plurality of pixels PX may be defined by the gate lines GLC and the data lines DLC in the display area I, the plurality of pixels PX may be arranged into a matrix, and pixel electrodes 191C may be disposed in the respective pixels PX. In this case, the display substrate SUB1C may include the plurality of pixels PX arranged into a matrix and the pixel electrodes 191C in the display area I.

A driving unit (not shown) which provides a gate driving signal, a data driving signal, and the like to each pixel PX may be disposed in the non-display area II, and in this case, the display substrate SUB1C may include the driving unit (not shown) in the non-display area II.

Each of the pixel electrodes 191C may include subpixel electrodes 191-1C and 191-2C spaced apart from each other. For example, each of the subpixel electrodes 191-1C and 191-2C may have a tetragonal shape as a whole. Each of the subpixel electrodes 191-1C and 191-2C may be a slit pattern electrode. Specifically, as shown in FIGS. 2A and 2B, the slit pattern may include a cross-shaped stem SC, fine branches BC extending from the stem SC, and slits DC disposed among the fine branches BC. The cross-shaped stem SC may be formed into a cross shape (+) where a horizontal stem and a vertical stem intersect each other, and the fine branches BC may radially extend in the direction of approximately 45° from the cross-shaped stem SC. The surfaces of each of the slits DC facing each other with a horizontal stem therebetween may be substantially parallel to each other in a horizontal direction. The surfaces of each of the slits DC facing each other with a vertical stem therebetween may be substantially parallel to each other in a vertical direction.

The gate lines GLC may include gate electrodes 124-1C and 124-2C protruding from the gate lines GLC toward the pixel electrodes 191C in a second direction D2. The plurality of data lines DLC may include source electrodes 173-1C and 173-2C and drain electrodes 175-1C and 175-2C. The source electrodes 173-1C and 173-2C may protrude into a U shape from the data lines DLC. The drain electrodes 175-1C and 175-2C may be spaced apart from the source electrodes 173-1C and 173-2C.

The pixel electrodes 191C may receive data voltages through a switching element, for example, a thin film transistor. The gate electrodes 124-1C and 124-2C, which are control terminals of the thin film transistor, may be electrically connected to the gate lines GLC, the source electrodes 173-1C and 173-2C, which are input terminals of the thin film transistor, may be electrically connected to the data lines DLC through contact holes 185-1C, 185-2C, 185-3C and 185-4C, and the drain electrodes 175-1C and 175-2C, which are output terminals of the thin film transistor, may be electrically connected to the pixel electrode 191C. Semiconductor layers 154-1C and 154-2C may be disposed to overlap the gate electrodes 124-1C and 124-2C. The source electrodes 173-1C and 173-2C and the drain electrodes 175-1C and 175-2C may be spaced apart from each other about the semiconductor layers 154-1C and 154-2C.

A sustain electrode line SLC may include a stem line 131C arranged substantially parallel to the plurality of gate lines GLC, and a plurality of branch lines 135C extending from the stem line 131C. The sustain electrode line SLC may be omitted, and the shape and arrangement of the sustain electrode line SLC may vary.

Figure 3:
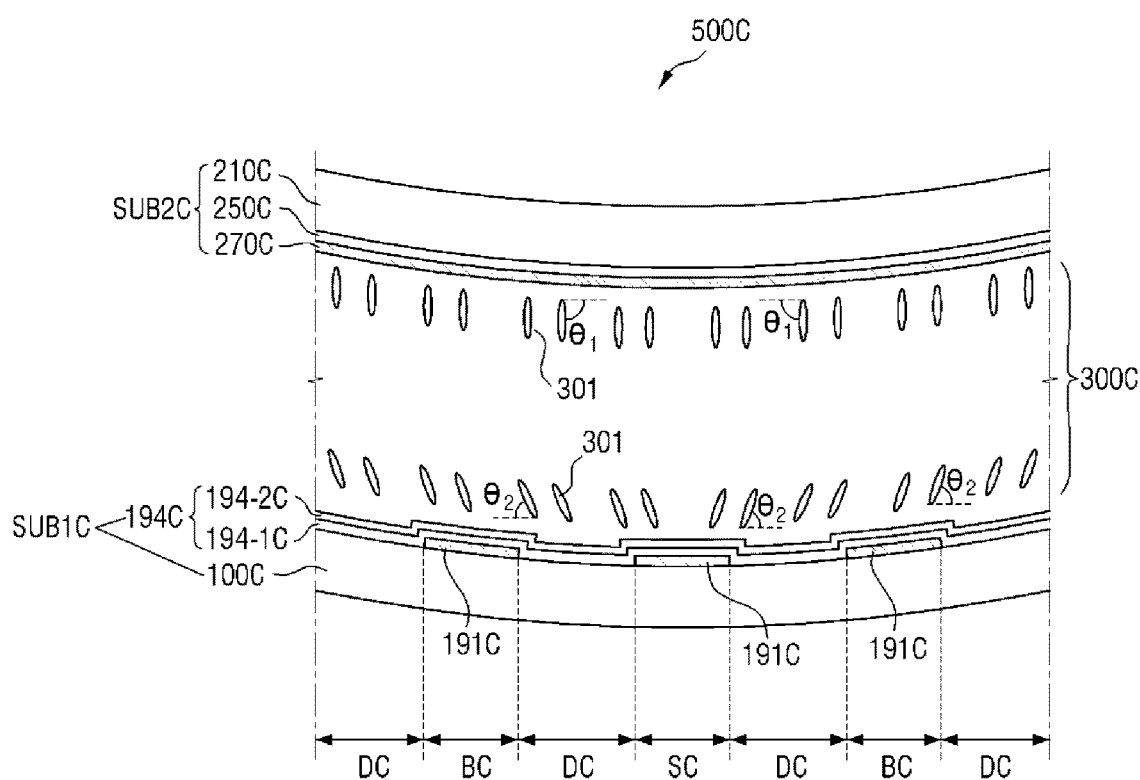
FIG. 3 is a schematic cross-sectional view taken along line shown in FIG. 2B which is an enlarged view of region A of FIG. 2A.
Figure 4:
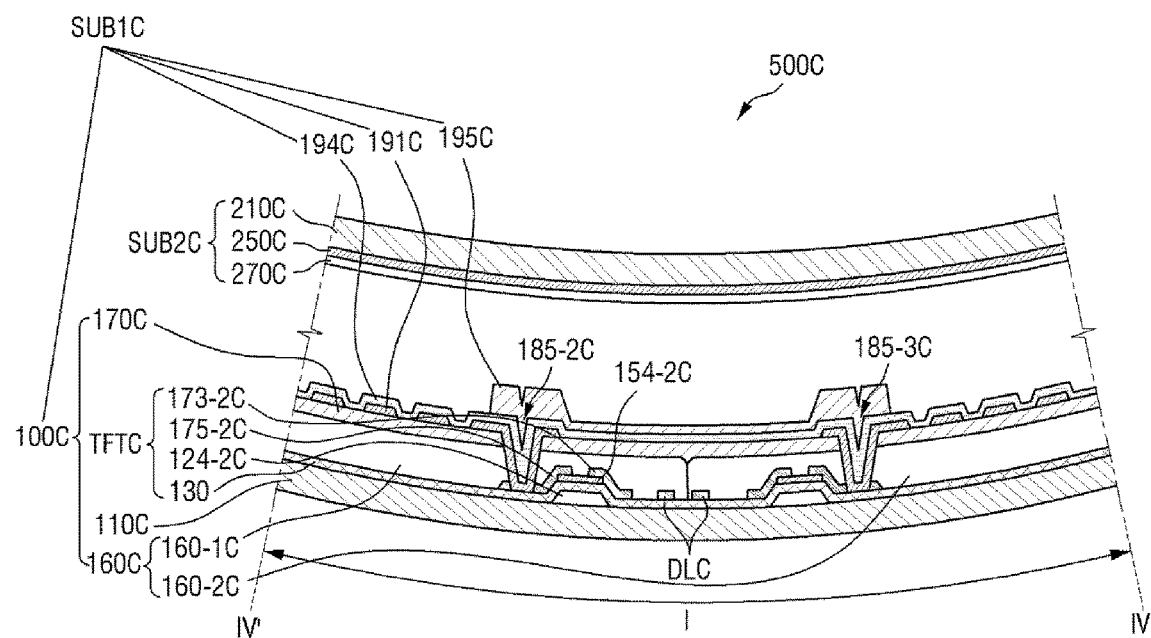
FIG. 4 is a schematic cross-sectional view taken along line IV-IV' of FIG. 2A.

FIG. 3 is a schematic cross-sectional view taken along line III-III' shown in FIG. 2B which is an enlarged view of region A of FIG. 2A. FIG. 4 is a schematic cross-sectional view taken along line IV-IV' of FIG. 2A.

Referring to FIG. 2 to FIG. 4, the display substrate SUB1C may include a switching element array substrate 100C, the pixel electrode 191C, a first curved liquid crystal alignment layer 194C and a light blocking pattern 195C. The switching element array substrate 100C may have a structure in which a first curved substrate 110C, a switching element TFTC, a color filter 160C, an organic layer 170C and the like are stacked into layers.

The first curved substrate 110C may be a transparent insulation substrate made of glass or a transparent plastic.

The switching element TFTC may be, for example, a thin film transistor, and include the gate electrode 124-2C, a gate insulation layer 130, the semiconductor layer 154-2C, an ohmic contact layer (not shown), the source electrode 173-2C and the drain electrode 175-2C.

The gate electrode 124-2C may be a control terminal of the switching element TFTC, and may be disposed on the first curved substrate 110C and made of a conductive material. The gate electrode 124-2C may be formed as a branch extending from the gate line GLC. The gate insulation layer 130C may be interposed between the gate electrode 124-2C and the semiconductor layer 154-2C so as to achieve electric insulation therebetween. The semiconductor layer 154-2C may be a channel layer of the switching element TFTC, and disposed on the gate insulation layer 130C. The source electrode 173-2C and the drain electrode 175-2C may be spaced apart from each other on the semiconductor layer 154-2C, and each may be made of a conductive material. The source electrode 173-2C and the drain electrode 175-2C may be each be formed as a branch extending from the data line DLC. An ohmic contact layer (not shown) may be formed between the source electrode 173-2C and the semiconductor layer 154-2C and between the drain electrode 175-2C and the semiconductor layer 154-2C.

The color filter 160C may be formed on the source electrode 173-2C and the drain electrode 175-2C. The color filter 160C may be formed in a portion of the display area I corresponding to each pixel, and may include a first color filter 160-1C and a second color filter 160-2C. For example, the first color filter 160-1C and the second color filter 160-2C may produce colors different from each other, and each of the first color filter 160-1C and the second color filter 160-2C may be, for example, one of a red color filter R, a green color filter G and a blue color filter B. The first color filter 160-1C and the second color filter 160-2C may be disposed alternately with each other.

An organic layer 170C made of an organic material may be formed on the color filter 160C. The organic layer 170C may be omitted.

The pixel electrode 191C may be electrically connected to the drain electrode 175-2C through contact holes 185-2C and 185-3C penetrating through the color filter 160C and the organic layer 170C. The pixel electrode 191C may include indium tin oxide, indium zinc oxide, indium oxide, zinc oxide, tin oxide, gallium oxide, titanium oxide, aluminum, silver, platinum, chrome, molybdenum, tantalum, niobium, zinc, magnesium, an alloy thereof, a laminated film thereof, or a combination thereof. The pixel electrode 191C may be a pattern electrode having at least either a protrusion pattern or a slit pattern. For example, the pixel electrode 191C may be a pattern electrode having the slit pattern. The pixel electrode 191C may cooperate with a common electrode 250C so as to generate an electric field and control an alignment direction of liquid crystal molecules 301 and 302 of the liquid crystal layer 300C interposed between the pixel electrode 191C and the common electrode 250C.

The first curved liquid crystal alignment layer 194C may include a first vertical alignment layer 194-1C and a pre-tilt alignment stabilization layer 194-2C. The first vertical alignment layer 194-1C may enable the liquid crystal molecules 301 to be substantially vertically aligned relative to the display substrate SUB1C in an initial state where no electric field is applied to the liquid crystal module 500C.

The first vertical alignment layer 194-1C may be formed of a branched polymer including a main chain, a vertical alignment group, and a degradation product of a polymerization initiator, and the vertical alignment group and the degradation product of a polymerization initiator may be bonded to the main chain of the polymer by respective spacer groups. The main chain may be, for example, a polyimide-based polymer including imide groups in a repeat unit thereof.

The vertical alignment group may be, for example, a $C_{1-8}$ alkyl group, a hydrocarbon derivative having a terminal $C_{1-8}$ alkyl group, a hydrocarbon derivative having a terminal $C_{3-6}$ cycloalkyl group, a hydrocarbon derivative having a terminal aromatic hydrocarbon, or the like. The vertical alignment group may enable the liquid crystal molecules 301 to be substantially vertically aligned relative to the display substrate SUB1C in an initial state where no electric field is applied to the liquid crystal module 500C.

The degradation product of a polymerization initiator may be reaction products remaining after the completion of a radical polymerization process initiated by the polymerization initiator. The degradation product of a polymerization initiator refers to a compound which is no longer capable of generating free radicals. The polymerization initiator may be, for example, one or more of the following Chemical Formulas 1 to 5.

Chemical Formula 1

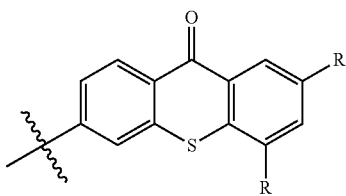

Chemical Formula 2

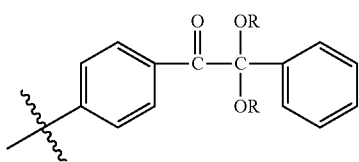

Chemical Formula 3

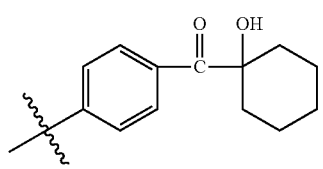

Chemical Formula 4

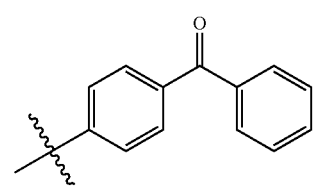

Chemical Formula 5

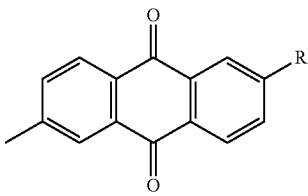

In the Chemical Formulas 1, 2, and 5 above, R is an alkyl group having 1 to 10 carbon atoms.

The pre-tilt alignment stabilization layer 194-2C may include a polymer of a reactive mesogen. The reactive mesogen may be, for example, a compound expressed by the following Chemical Formula 6. The pre-tilt alignment stabilization layer 194-2C may stabilize or fix the alignment state of the liquid crystal molecules 301 which are tilt-aligned at a predetermined pre-tilt angle relative to the display substrate SUB1C in an initial state where no electric field is applied to the liquid crystal module 500C. In this case, a tilt-aligned state may mean a state in which the liquid crystal molecules 301 have a pre-tilt angle which is different from the state of being substantially vertically aligned relative to the display substrate SUB1C.

$$P1\text{-}SP1\text{-}A1\text{-}(A2)_m\text{-}SP2\text{-}P2 \qquad \text{Chemical Formula 6}$$

In Chemical Formula 6 above, P1 and P2 may be a polymerizable terminal group, and may be, for example, each independently a (meth)acrylate group, a vinyl group, a vinyloxy group, or an epoxy group or the like, SP1 may be a spacer group interconnecting P1 and A1, and may be, for example, a $C_{1-12}$ alkyl group, a $C_{1-12}$ alkoxy group or the like, SP2 may be a spacer group connecting P2 and A2, and may be, for example, a $C_{1-12}$ alkyl group, a $C_{1-12}$ alkoxy group or the like, and each of A1 and A2 may be a mesogen structure, and may be, for example, cyclohexyl, biphenyl, terphenyl, naphthalene, thiophene or the like, and at least one hydrogen in the cyclohexyl, biphenyl, terphenyl, naphthalene, thiophene or the like may be substituted with halogen, —$OCH_3$, a $C_{1-6}$ alkyl group or the like. In the Chemical Formula 6 above, m may be a natural number 0 to 3.

For example, the reactive mesogen may be at least one of compounds expressed by the following Chemical Formulas 7 and 8.

Chemical Formula 7

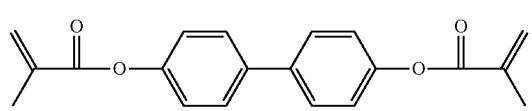

Chemical Formula 8

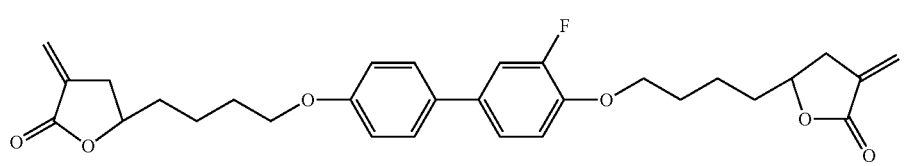

The light blocking pattern 195C may be disposed on the first curved liquid crystal alignment layer 194C, however, the location of the light blocking pattern 195C is not limited thereto as long as the light blocking pattern 195C overlaps opaque elements such as the switching element TFTC, gate lines (not shown), and data lines DLC. The light blocking pattern 195C is generally referred to as a black matrix. As shown in the drawings, the light blocking pattern 195C may, for example, be overlapped with the switching element TFTC and data lines DLC on the first curved liquid crystal alignment layer 194C in the display area I. Although not shown in the drawings, referring to FIG. 2 and FIG. 4, the light blocking pattern 195C may be overlapped with the gate lines GLC. The light blocking pattern 195C may extend to a non-display area (not shown) rather than being disposed only in the display area I.

The opposing display substrate SUB2C may include a second curved substrate 210C, the common electrode 250C, and a second curved liquid crystal alignment layer 270C. The curved liquid crystal display device according to an embodiment may have as opposing surface facing a viewer which has a concave-shaped curve, and the opposing surface may be the opposing display substrate SUB2C.

The second curved substrate 210C may be a transparent insulation substrate made of glass or a transparent plastic.

The common electrode 250C may be disposed on the second curved substrate 210C. The common electrode 250C may be a patternless electrode having no slit pattern and no protrusion pattern. The liquid crystal module 500C may include the pattern electrode only on the display substrate SUB1C and the patternless electrode on the opposing display substrate SUB2C, thereby enabling an alignment of the liquid crystal molecules 301 and 302 to be controlled through the use of the pattern electrode. The common electrode 250C may be include indium tin oxide, indium zinc oxide, indium oxide, zinc oxide, tin oxide, gallium oxide, titanium oxide, aluminum, silver, platinum, chrome, molybdenum, tantalum, niobium, zinc, magnesium, an alloy thereof, a laminated film thereof, or a combination thereof. The common electrode 250C may be formed to cover the entire display area I. That is, the common electrode 250C may be disposed on the entire surface of the display area I, regardless of the number of pixels.

The second curved liquid crystal alignment layer 270C may be disposed on the common electrode 250C. That is, the second curved liquid crystal alignment layer 270C may be disposed on a surface of the common electrode 250C facing the first curved substrate 110C. Furthermore, the second curved liquid crystal alignment layer 270C may include nanoparticles with a hydrophobic group and a hydrophilic group.

Unlike the first curved liquid crystal alignment layer 194C, the second curved liquid crystal alignment layer 270C may not include a degradation product of a polymerization initiator. That is, only the first curved liquid crystal alignment layer 194C may include the degradation product of a polymerization initiator. The polymerization initiator is included only in the first curved liquid crystal alignment layer 194C among the alignment layers formed on the first curved substrate 110C and the second curved substrate 210C during manufacture of a curved liquid crystal display device, thus enabling the polymerization of a reactive mesogen to be predominantly performed in the first curved liquid crystal alignment layer 194C, with the result that the liquid crystal molecules 301 provided on the first curved liquid crystal alignment layer 194C may be pre-tilted at an increased angle.

In other words, the liquid crystal layer 300C may include first liquid crystal molecules 301 having negative dielectric anisotropy aligned on the surface of the first curved liquid crystal alignment layer 194C and second liquid crystal molecules 302 aligned on the surface of the second curved liquid crystal alignment layer 270C, and the second liquid crystal molecules 302 may be vertically aligned in an initial state where no electric field is applied while the first liquid crystal molecules 301 may have a tilt-aligned state.

The nanoparticles contained in the second curved liquid crystal alignment layer 270C may include chain type, i.e., linear hydrocarbons having two terminal ends, and the hydrophobic group and the hydrophilic group may be located respectively at the two terminal ends. More specifically, the hydrophilic group of the nanoparticles may be positioned adjacent to the common electrode 250C, which is a patternless electrode, and adsorbed to the common electrode 250C. The hydrophobic group of the nanoparticles may be positioned adjacent to the liquid crystal molecules 302 which are adjacent to the second curved liquid crystal alignment layer 270C of the liquid crystal layer 300C. The second liquid crystal molecules 302 adjacent to the second curved liquid crystal alignment layer 270C, may be vertically aligned by the nanoparticles contained in the second curved liquid crystal alignment layer 270C. More specifically, the nanoparticles may include hexadecyl trimethyl ammonium bromide (HTAB) or a polyhedral oligomeric silsesquioxane (POSS).

Although not shown in the drawings, the curved liquid crystal display device according to an embodiment may further include a backlight assembly (not shown) disposed at a rear surface of the display substrate SUB1C so as to provide light to the liquid crystal layer 300C.

The backlight assembly may further include, for example, a light guide plate, a light source, a reflector member, an optical sheet, and the like.

The light guide plate may serve to change the path of light generated from the light source to a liquid crystal layer side, and include a light incident surface to which the light generated from the light source is incident, and a light emitting surface directed toward the liquid crystal layer. The light guide plate may be made of a light-transmitting material having a constant refractive index, such as a poly(methyl methacrylate) (PMMA) material or a polycarbonate (PC) material, but the present disclosure is not limited thereto.

Since the light incident to one side or both sides of the light guide plate made of the a light-transmitting material may have an angle within a threshold angle of the light guide plate, the angle of the light incident to an inside of the light guide plate and the angle of the light incident to an upper or lower surface of the light guide plate may deviate from the threshold angle and be transmitted evenly to the inside of the light guide plate rather than being emitted to an outside of the light guide plate.

A scattering pattern may be formed on either the upper surface or the lower surface of the light guide plate, so as to enable the guided light to be emitted upward. For example, a scattering pattern may be formed on the lower surface facing the light emitting surface. That is, the scattering pattern may be printed on one surface of the light guide plate so as to enable the light transmitted from the inside of the light guide plate to be emitted upward. The scattering pattern may be formed by printing using ink, but the present disclosure is not limited thereto. The light guide plate may have fine grooves or protrusions formed therein, and various other modifications can be made.

The reflector member of the backlight assembly may be interposed between the light guide plate and a bottom part of a lower accommodation member. The reflector member may serve to reflect the light emitted through the lower surface of the light guide plate, that is, a surface facing the light emitting surface, and supply the reflected light back to the light guide plate. The reflector member may be formed into a film, but the present disclosure is not limited thereto.

The light source may be disposed to face the light incident surface of the light guide plate. The number of the light sources is not limited and may be modified as needed. For example, one light source may be provided only at one side surface of the light guide plate, or three or more light sources may be provided to correspond to three or more side surfaces of the light guide plate among the four side surfaces thereof. Furthermore, a plurality of light sources may be provided to correspond to one of the four side surfaces of the light guide plate. Although a description has been provided regarding a side light type in which the light source is provided at the side surfaces of the light guide plate, a direct below type, a planar light source type, and the like, classified based on the feature of the backlight unit, may be employed.

The light source may be a white LED which emits white light, or a plurality of LEDs which emit respectively red (R), green (G), and blue (B) color light. When the light source is a plurality of LEDs which emit respectively red (R), green (G) and blue (B) color light, the plurality of LEDs can be turned on at the same time to express white light by color mixture.

FIG. 5 to FIG. 9 schematically illustrate a method for manufacturing a curved liquid crystal display device according to an embodiment.

Figure 5:
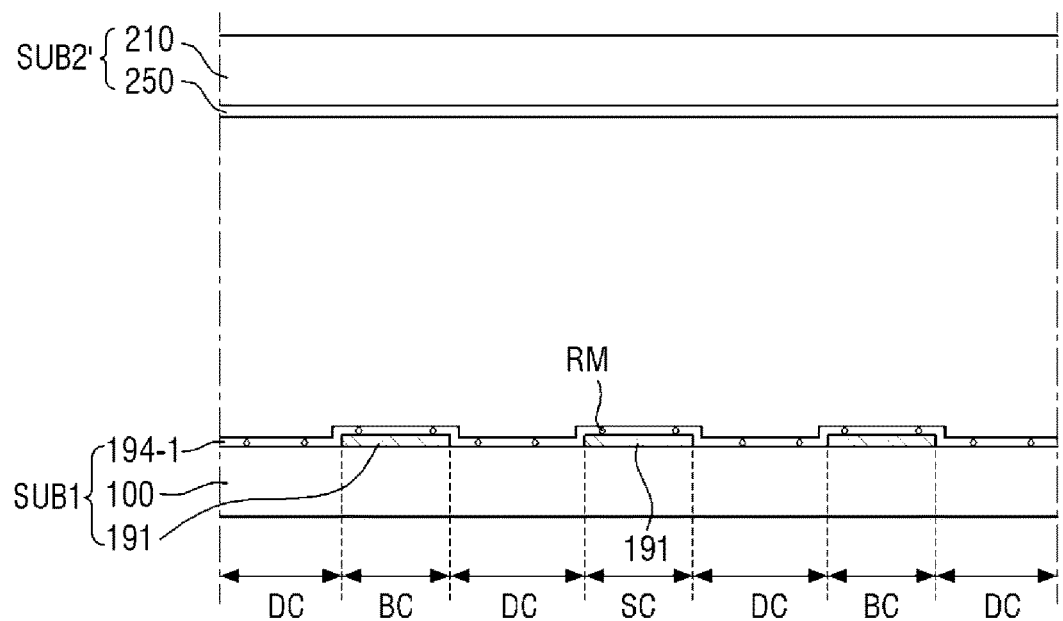
FIG. 5 to FIG. 9 are cross-sectional views schematically illustrating a method for manufacturing a curved liquid crystal display device according to an embodiment.

Referring to FIG. 5, a method for manufacturing a curved liquid crystal display device may include preparing a first flat substrate 100 having a pattern electrode 191 formed on a surface, and preparing a second flat substrate 210 facing the first flat substrate 100 and having a patternless electrode 250 formed on a surface. The pattern electrode 191 may be a pixel electrode, and the patternless electrode 250 may be a common electrode.

The method may include subsequently forming a pre-vertical alignment layer 194-1 including a reactive mesogen (RM) and a polymerization initiator on the pattern electrode 191 on the first flat substrate 100.

Figure 6:
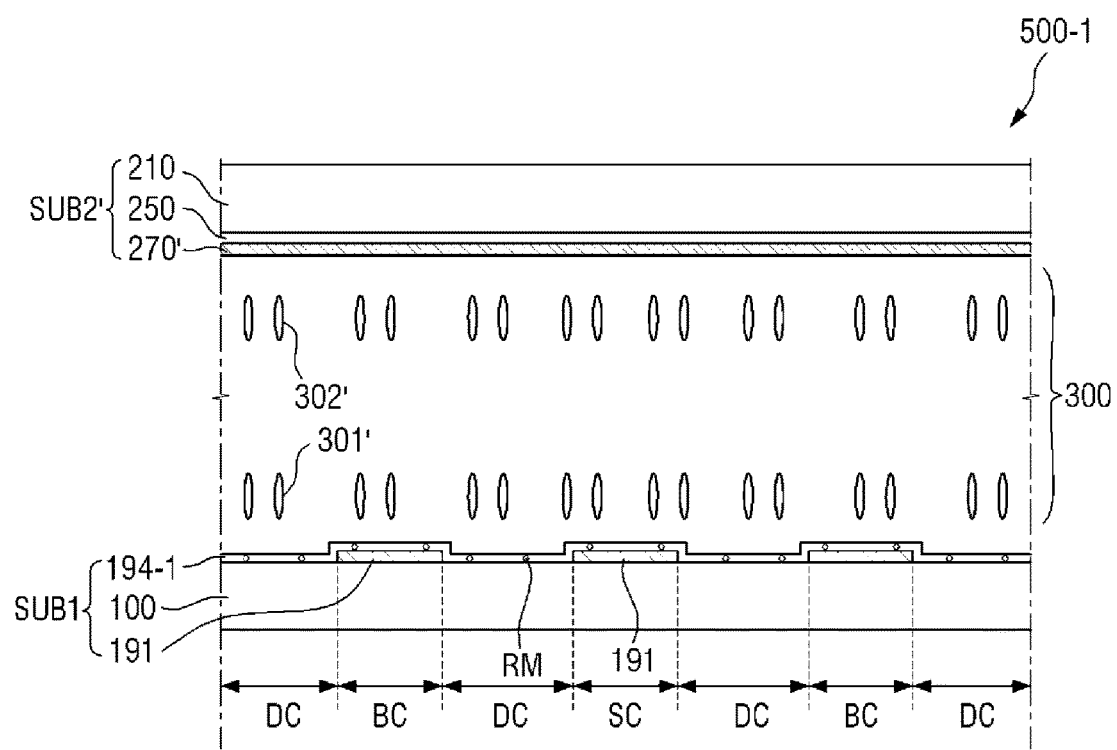

The method may include a subsequent liquid crystal injection step which includes injecting a liquid crystal composition and nanoparticles including a hydrophobic group and a hydrophilic group between the first flat substrate 100 and the second flat substrate 210, to form a liquid crystal layer, as shown in FIG. 6.

The hydrophobic terminal group of the nanoparticles contained in the liquid crystal layer 300 may be positioned on the exposed patternless electrode 250. Furthermore, the hydrophilic terminal groups may be aligned in the vertical direction adjacent to the liquid crystal molecules 302 which are adjacent to the patternless electrode 250. Thus, the liquid crystal molecules 302 adjacent to the patternless electrode 250 may be vertically aligned by the nanoparticles after the liquid crystal injection step.

The nanoparticles may be contained in the liquid crystal layer 300 in an amount ranging from about 0.01 weight % to about 0.5 weight %, based on a total weight of the liquid crystal layer. If the nanoparticles are present in an amount of less than about 0.01 weight %, it may be difficult to pre-tilt the liquid crystal molecules, and if the nanoparticles exceed about 0.5 weight %, the nanoparticles may be agglomerated together. Furthermore, the nanoparticles may include linear hydrocarbons having two terminal ends, and the hydrophobic group and hydrophilic group may be located respectively at the two terminal ends.

The nanoparticles may include, for example, hexadecyl trimethyl ammonium bromide (HTAB) or a polyhedral oligomeric silsesquioxane (POSS).

For example, the nanoparticles may include a hydrophobic group including a linear hydrocarbon, and a hydrophilic group in which nitrogen ions and bromine ions are bonded. That is, the linear hydrocarbon may have two terminals ends, and the hydrophobic group is located at one terminal end and the hydrophilic group is located at the other terminal end. The hydrophilic group of the nanoparticles may be adsorbed to a surface of the patternless electrode 250 by a bond such as a hydrogen bond, and the linear hydrocarbon may be aligned in a vertical direction on the second flat substrate 210. That is, the linear hydrocarbons may be alkyl chains of a vertical alignment layer which enable alignment of the liquid crystals in a vertical direction. As described above, a second vertical alignment layer 270 may be formed on the patternless electrode 250 after the liquid crystal injection step.

Figure 7:
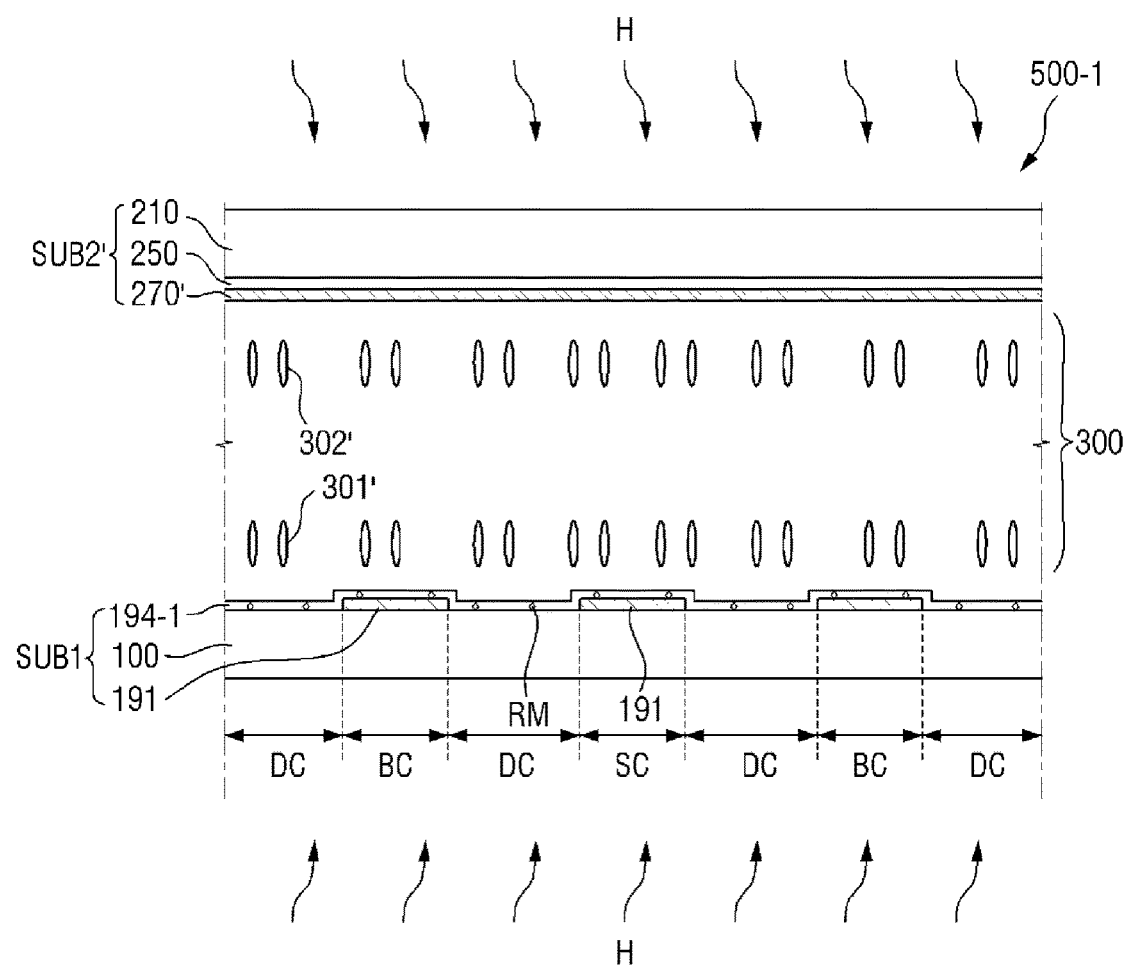

The method may include subsequently eluting the reactive mesogen from the pre-vertical alignment layer 194-1 to the liquid crystal layer 300 by applying a heat treatment H, as shown in FIG. 7. The heat treatment H may be performed in both directions, for example, toward the first flat substrate 100 and the second flat substrate 210, or only in a single direction toward the first flat substrate 100.

Figure 8:
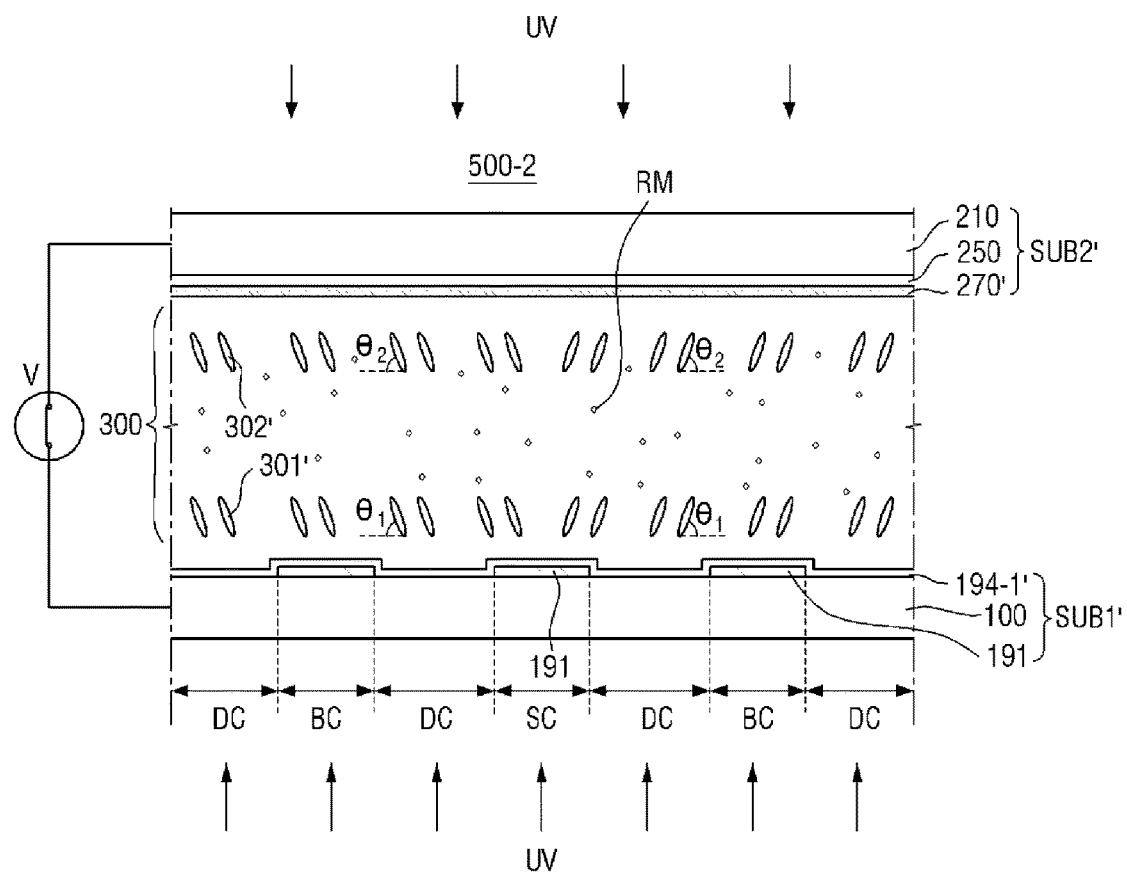
Figure 9:
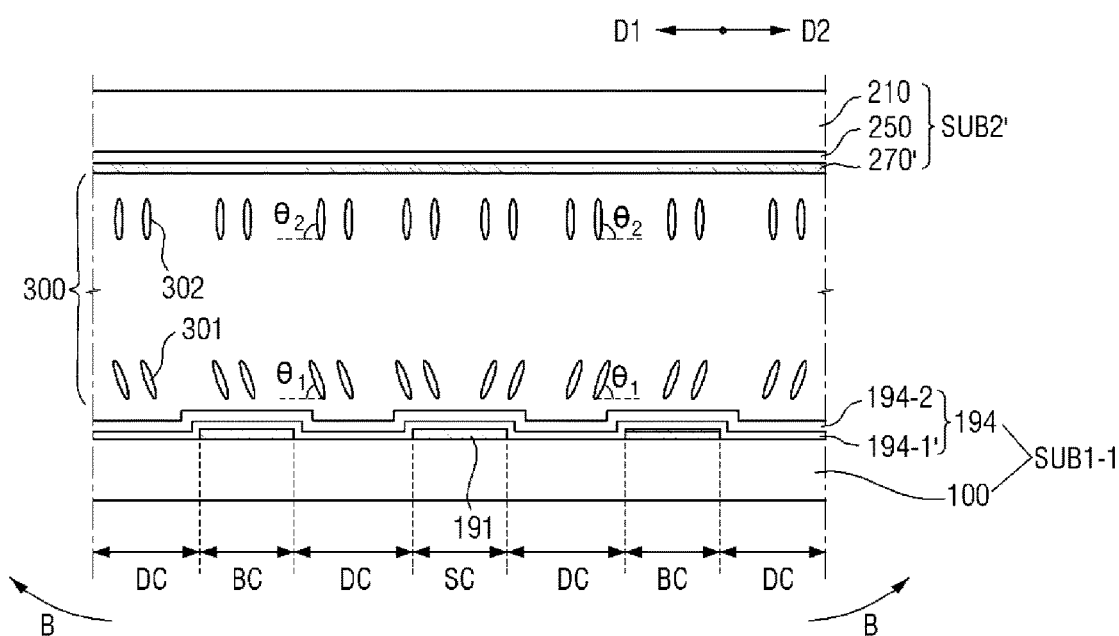

The reactive mesogen RM may be eluted from the pre-vertical alignment layer 194-1 and into the liquid crystal layer 300 as shown in FIG. 8 by the heat treatment H of FIG. 7. An ultraviolet light exposure UV process in the presence of an electric field may be performed to polymerize the eluted reactive mesogen RM as shown in FIG. 8, and thus a vertical alignment layer 194-1' including the degradation product of a polymerization initiator and a pre-tilt alignment stabilization layer 194-2 including a polymer of the reactive mesogen may be formed on the first flat substrate 100 as shown in FIG. 9. The pre-tilt alignment stabilization layer 194-2 may be selectively formed on the first vertical alignment layer 194-1' among the first vertical alignment layer 194-1' and a second curved liquid crystal alignment layer 270'.

Referring back to FIG. 8, when an electric field is applied, the liquid crystal molecules 301 and 302 may be tilt-aligned at pre-tilt angles $\theta_1$ and $\theta_2$, respectively, relative to a display substrate SUB1' and an opposing display substrate SUB2'. The pre-tilt angle $\theta_1$ of the liquid crystal molecules 301 aligned on the display substrate SUB1' and the pre-tilt angle $\theta_2$ of the liquid crystal molecules 302 aligned on the opposing display substrate SUB2' may be substantially the same. The display substrate SUB1' and the first pre-vertical alignment layer 194-1' may not include any reactive mesogen RM, or the first pre-vertical alignment layer 194-1' may include reactive mesogen in only a very small amount, and the opposing display substrate SUB2' may include vertically aligned nanoparticles.

The liquid crystal molecules 301 on the pre-tilt alignment stabilization layer 194-2 may be maintained in their pre-tilt state even when the electric field is removed from the liquid crystal panel 500-3 as shown in FIG. 9. To the contrary, the liquid crystal molecule 302 aligned on the second curved liquid crystal alignment layer 270' may be substantially vertically aligned relative to the opposing display substrate SUB2' when the electric field is removed from the liquid crystal panel. Thus, there may be a difference between the pre-tilt angle $\theta_1$ of the liquid crystal molecules 301 aligned on the pre-tilt alignment stabilization layer 194-2 and the pre-tilt angle $\theta_2$ of the liquid crystal molecules 302 aligned on the second curved liquid crystal alignment layer 270'. That is, when the electric field is removed after the light exposure in the presence of the electric field, the liquid crystal molecules 302 aligned on the second curved liquid crystal alignment layer 270' may be vertically aligned while the liquid crystal molecules 301 on the pre-tilt alignment stabilization layer 194-2 remain aligned at the pre-tilt angle $\theta_1$.

Thus, the liquid crystal display device according to an embodiment may have advantages in that a texture caused by a misalignment between an upper curved display substrate and a lower curved display substrate can be minimized or prevented. The upper curved display substrate may correspond to the opposing display substrate SUB2' and the lower curved display substrate may correspond to the display substrate SUB1-1.

Although not shown in the drawings, the method may further include irradiating fluorescent ultraviolet (UV) light after the light exposure in the presence of the electric field. This irradiation of fluorescent UV light can remove the residual reactive mesogen monomers remaining in the liquid crystal layer 300. That is, the unreacted reactive mesogen monomer remaining in the liquid crystal layer 300 after the light exposure in the presence of the electric field, can be removed.

Referring to FIG. 9, the method may include bending the first flat substrate 100 and the second flat substrate 210, and the liquid crystal panel 500-3 may be bent in a curve direction B so as to manufacture the liquid crystal panel 500C. In this case, either the display substrate SUB1-1 or the display substrate SUB2' may move in a left direction D1 or a right direction D2 relative to each other.

Figure 10:
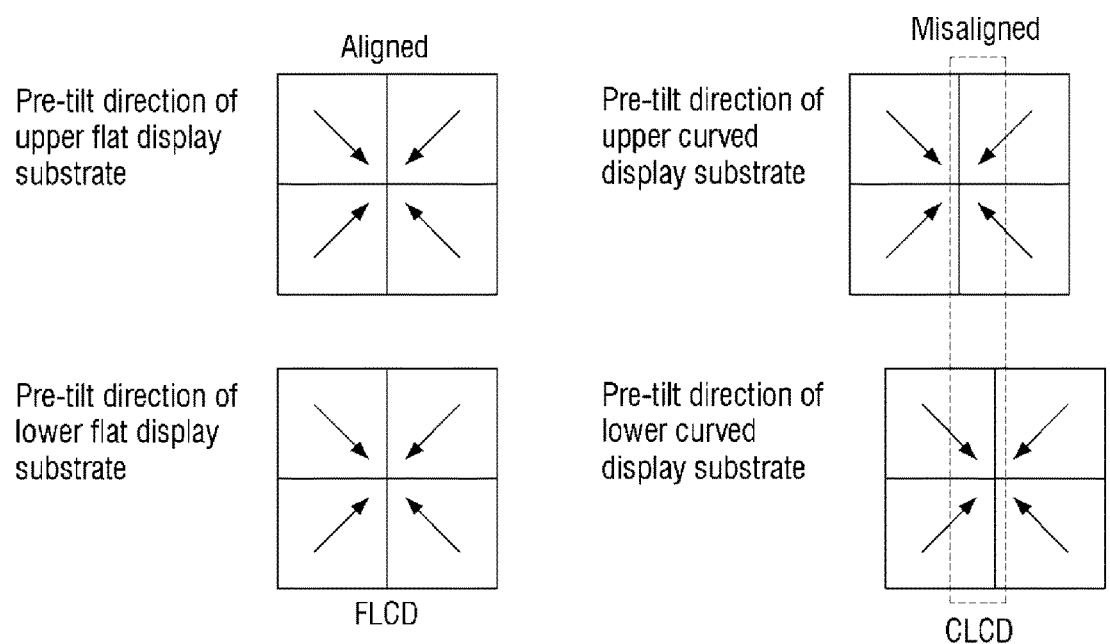
FIG. 10 is an illustration comparing an alignment state between upper display substrates and lower display substrates in a flat panel liquid crystal display device (FLCD) and a curved liquid crystal display device (CLCD) manufactured therefrom.

In this regard, FIG. 10 illustrates an alignment state between upper display substrates and lower display substrates in an existing flat panel liquid crystal display device (FLCD) and an existing curved liquid crystal display device (CLCD) manufactured therefrom.

The existing flat panel liquid crystal display device (FLCD) may be a polymer stabilized aligned (PSA) or polymer stabilized-vertical aligned flat panel liquid crystal display device, in which a pre-tilt alignment stabilization layer is formed on both an upper flat display substrate and a lower flat display substrate, and the liquid crystal molecules aligned on the pre-tilt alignment stabilization layer may have the same pre-tilt angle and form multiple domains.

Referring to FIG. 10, when a curved liquid crystal display device (CLCD) known in the art is manufactured from a known flat panel liquid crystal display device (FLCD), an alignment error may occur between the upper curved display substrate and the lower curved display substrate. Due to the alignment error, a collision may occur between the alignment direction of the liquid crystal molecules aligned on the upper curved display substrate and the alignment direction of the liquid crystal molecules aligned on the lower curved display substrate. Thus, the liquid crystal molecules interposed between the upper and lower display substrates may be substantially vertically aligned, with the result that the texture (dotted square region in CLCD) is viewed as specks or dark area. Thus, the existing curved liquid crystal display device (CLCD) may have degraded light transmittance.

According to the curved liquid crystal display device of the present inventive concept, the liquid crystal molecules are positioned adjacent to the first curved substrate and thus may be pre-tilted at a predetermined angle while the liquid crystal molecules provided at the surface of the second curved substrate are substantially vertically aligned. As a result, a collision error between the alignment direction of the liquid crystal molecules aligned on the upper curved display substrate and the alignment direction of the liquid crystal molecules aligned on the lower curved display substrate may be avoided, thereby preventing the occurrence of texture and improving overall light transmittance of the liquid crystal display.

While exemplary embodiments have been shown and described above, it will be apparent to those skilled in the art that modifications and variations could be made without departing from the spirit and scope of the invention as defined by the appended claims. The exemplary embodiments should be considered in a descriptive sense only and not for purposes of limitation.

What is claimed is:

1. A curved liquid crystal display device comprising:
   a first curved substrate;
   a second curved substrate facing the first curved substrate;
   a liquid crystal layer interposed between the first curved substrate and the second curved substrate;
   a first curved liquid crystal alignment layer interposed between the liquid crystal layer and the first curved substrate;
   a pre-tilt alignment stabilization layer interposed between the liquid crystal layer and the first curved liquid crystal alignment layer; and
   a second curved liquid crystal alignment layer interposed between the liquid crystal layer and the second curved substrate,
   wherein the first curved liquid crystal alignment layer is a curved vertical alignment layer comprising a degradation product of a polymerization initiator, and the pre-tilt alignment stabilization layer comprises a polymer of a reactive mesogen,
   wherein the second curved liquid crystal alignment layer comprises a nanoparticle comprising a hydrophobic group and a hydrophilic group,
   wherein the liquid crystal layer comprises first liquid crystal molecules aligned on a surface of the first curved liquid crystal alignment layer and second liquid crystal molecules aligned on a surface of the second curved liquid crystal alignment layer,
   wherein the second liquid crystal molecules are configured to be vertically aligned in an initial state where no electric field is applied and the first liquid crystal molecules are configured to have a pre-tilt angle in an initial state where no electric field is applied, and
   wherein the second liquid crystal molecules are closer to a center of curvature of the curved liquid crystal display than the first liquid crystal molecules.

2. The curved liquid crystal display device of claim 1, wherein the first curved liquid crystal alignment layer comprises a branched polymer, and the degradation product of the polymerization initiator is bonded to a side chain branched from a main chain of the branched polymer.

3. The curved liquid crystal display device of claim 1, wherein the second curved liquid crystal alignment layer does not comprise the degradation product of the polymerization initiator.

4. The curved liquid crystal display device of claim 1, wherein the nanoparticle comprises a linear hydrocarbon having two terminal ends, and the hydrophobic group is positioned at one terminal end and the hydrophilic group is positioned at the other terminal end.

5. The curved liquid crystal display device of claim 1, further comprising:
- a pattern electrode interposed between the first curved substrate and the first curved liquid crystal alignment layer and having a slit pattern; and
- a patternless electrode interposed between the second curved liquid crystal alignment layer and the second curved substrate and having no slit pattern.

6. The curved liquid crystal display device of claim 5, wherein the hydrophilic group of the nanoparticle is adsorbed to the patternless electrode.

7. The curved liquid crystal display device of claim 6, wherein the hydrophobic group of the nanoparticle is adjacent to the liquid crystal layer.

8. The curved liquid crystal display device of claim 1, wherein the nanoparticle comprises hexadecyl trimethyl ammonium bromide or a polyhedral oligomeric silsesquioxane.

9. A method for manufacturing a curved liquid crystal display device comprising:
- providing a first flat substrate having a pattern electrode formed on a surface thereof, and a second flat substrate facing the first flat substrate and having a patternless electrode formed on a surface thereof;
- forming a pre-vertical alignment layer comprising a reactive mesogen and a polymerization initiator on the pattern electrode on the first flat substrate;
- injecting a liquid crystal composition and a nanoparticle comprising a hydrophobic group and a hydrophilic group between the first flat substrate and the second flat substrate to form a liquid crystal layer;
- eluting the reactive mesogen from the pre-vertical alignment layer to the liquid crystal layer by applying a heat treatment;
- forming a vertical alignment layer and a pre-tilt alignment stabilization layer to form a first liquid crystal alignment layer on the first flat substrate, wherein the vertical alignment layer comprises a degradation product of the polymerization initiator and the pre-tilt alignment stabilization layer comprises a polymer of the reactive mesogen, and wherein the vertical alignment layer and the pre-tilt stabilization layer are formed by light exposure in the presence of an electric field; and
- bending the first flat substrate and the second flat substrate to provide the curved liquid crystal display device,
- wherein the liquid crystal layer comprises first liquid crystal molecules aligned on a surface of the first curved liquid crystal alignment layer on the first curved substrate, and second liquid crystal molecules aligned on a surface of a second curved liquid crystal alignment layer on the second curved substrate,
- wherein the second liquid crystal molecules are configured to be vertically aligned in an initial state where no electric field is applied and the first liquid crystal molecules are configured to have a pre-tilt angle in an initial state where no electric field is applied, and
- wherein the second liquid crystal molecules are closer to a center of curvature of the curved liquid crystal display than the first liquid crystal molecules.

10. The method of claim 9, wherein the liquid crystal layer comprises the nanoparticle in a range of 0.01 weight percent to 0.5 weight percent, based on a total weight of the liquid crystal layer.

11. The method of claim 9, wherein the nanoparticles comprise a linear hydrocarbon having two terminal ends, and the hydrophobic group is positioned at one terminal end and the hydrophilic group is positioned at the other terminal end.

12. The method of claim 9, wherein the nanoparticles comprise hexadecyl trimethyl ammonium bromide or a polyhedral oligomeric silsesquioxane (POSS).

13. The method of claim 9, wherein the hydrophilic group of the nanoparticle is adsorbed to the patternless electrode and the hydrophobic group is positioned adjacent to the liquid crystal layer after the injecting of the liquid crystal composition.

14. The method of claim 13, wherein the liquid crystal layer comprises the second liquid crystal molecules adjacent to a surface of the patternless electrode of the second flat substrate and vertically aligned by the nanoparticle after the injecting of the liquid crystal composition.

15. The method of claim 14, wherein the second liquid crystal molecules are vertically aligned with respect to the stabilization layer as compared with the first liquid crystal molecules on a surface of the pre-tilt alignment stabilization layer when the electric field is removed after the light exposure while applying an electric field.

16. The method of claim 9, further comprising irradiating fluorescent ultraviolet light after the light exposure in the presence of the electric field.

* * * * *